Jan. 17, 1967 R. N. SUMMERVILLE 3,298,058
APPARATUS FOR FORMING MELT DROPLETS
Filed Dec. 31, 1964
FIG. 1
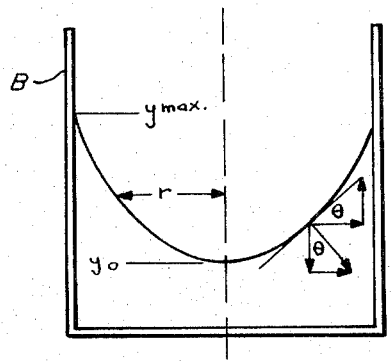
FIG. 2
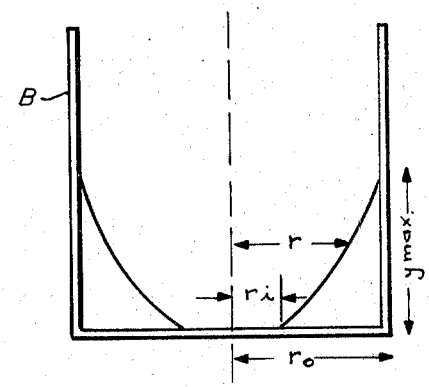
FIG. 4
FIG. 3
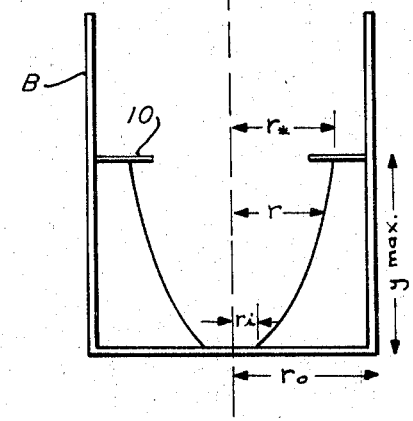
FIG. 5
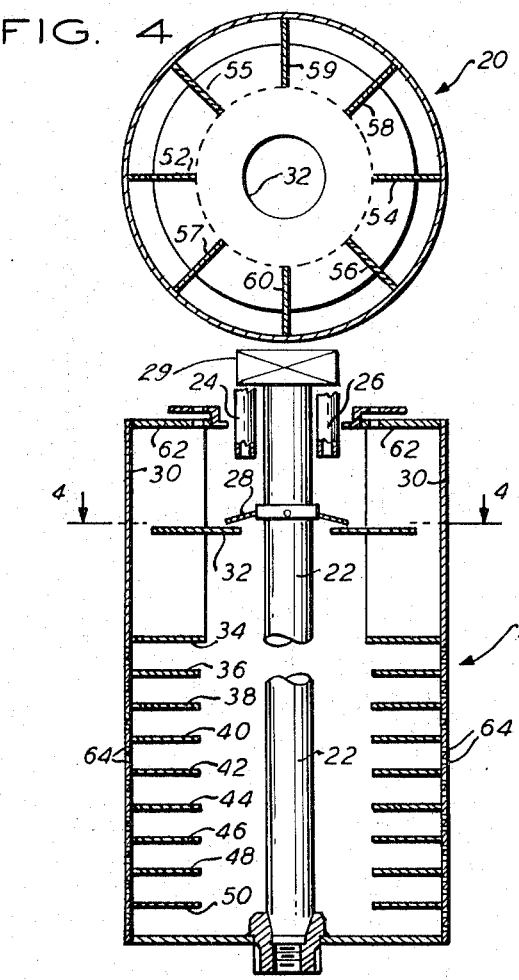
INVENTOR.
ROBERT N. SUMMERVILLE
BY
Flynn Marn & Jangarathis
ATTORNEYS

United States Patent Office 3,298,058
Patented Jan. 17, 1967

3,298,058
APPARATUS FOR FORMING MELT DROPLETS
Robert N. Summerville, Cranford, N.J., assignor to The Lummus Company, New York, N.Y.
Filed Dec. 31, 1964, Ser. No. 422,837
11 Claims. (Cl. 18—2.6)

In general, this invention relates to a new and improved apparatus for producing uniform, substantially spherical objects. More particularly, it relates to a new and improved rotating prilling basket for producing uniform melt droplets or prills of urea or other fertilizer compositions.

It is well known that globular fertilizer granules can be prepared by spraying a fertilizer melt, such as ammonium nitrate, mixed with limestone or dicalcium phosphate, or a melt of a nitrogen-phosphate-potassium fertilizer, or urea through small apertures provided in the wall of a reservoir rotating around a vertical axis, the so-called prilling basket. During their fall, the sprayed drops solidify to form round granules with a smooth surface, the so-called prills.

In the prior art prilling baskets, the particle size distribution varied over a considerably large range and there were no design criteria available for determining how to maintain the particle size within limits. Further, there were no design criteria available to control accurately the size of these prills.

Therefore, it is the general object of this invention to achieve a new and improved prilling basket.

Another object of this invention is the provision of a new and improved prilling basket which is manufactured in accordance with predetermined design criteria to produce prills of uniform size and shape, or with a controlled size distribution.

A further object of this invention is the provision of an improved prilling basket in which the velocity of the melt as it is passed through the holes in the prilling basket is maintained substantially constant along the length of the prilling basket.

Still another object of this invention is the provision of an improved design criteria for a prilling basket which enables one to easily determine the basket diameter required for a given product capacity and prill size.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a schematic showing of the surface of fertilizer melt in a rotating basket.

FIGURE 2 is a schematic showing of the surface of a fertilizer melt generated in a rotating basket which does not bridge the basket.

FIGURE 3 is a curve similar to FIGURE 2 wherein the basket has horizontal baffles to constrain the liquid surface.

FIGURE 4 is a top view taken along the line 4—4 in FIGURE 5 of a prilling basket built in accordance with the principles of the present invention.

FIGURE 5 is a cross-sectional view of an elevation of the same prilling basket.

In the study of the operation of prilling baskets, it has been determined that the melt droplets are formed by a breaking of the liquid jets issuing from holes in the sides of the basket rather than by the droplets being flung off from the outside of the basket. From this observation, it has been concluded that the hole size, the tangential velocity of the basket wall, and the melt velocity through the holes can be the only variables of fundamental significance in determining rotating basket performance. Therefore, the present invention has developed a method of relating the hole velocity and the variation of hole velocity to the production rate and the basket design with its operating factors.

The present invention designs for a relatively constant hole velocity at all points in the basket. With such a design, it is possible to reduce the size variation of the prills. Such design criteria, obviously, have application in prill tower sizing and in determining the minimum prill tower diameter for a given product capacity and prill size.

These conclusions have been reached by an analysis set forth below. Implicit in this analysis are the assumptions that the melt is accelerated to the same, or nearly the same, angular velocity as the basket and that the pressure drop of the melt inside the basket caused by fluid flow can be virtually neglected. The means for insuring that the melt is accelerated to the same or nearly the same, angular velocity as the basket will be best seen in the embodiment shown in FIGURE 4. It will be recognized, of course, that such conclusions will have valid practical design applicability even though such assumptions are not completely realized in actual operation.

The equation of the liquid surface in a rotating basket is determined, as can be seen in FIGURE 1, by relating the height $y$ to the radius $r$ of the fertilizer melt interface in the basket B. That is:

$$\frac{dy}{dr} = \tan\theta = \frac{\text{the centrifugal acceleration}}{\text{gravity}}$$

Since the net force on the liquid is perpendicular to the liquid surface, $$\frac{dy}{dr} = \frac{\omega^2 r}{g}$$

or $$y = \frac{\omega^2 r^2}{2g} + y_0$$

where $\omega$ is angular velocity, $g$ is the acceleration of gravity, and $y_0$ is the lowest point of the liquid surface in the rotating basket B, or, if the melt liquid surface does not bridge the basket, $y_0$ is the bottom of the basket.

Accordingly, when the melt surface does not bridge the basket, $$y - y_0 = \frac{\omega^2(r^2 - r_i^2)}{2g}$$

$r_i$ is the radius of the melt surface at $y_0$ when $y_0=0$.

In continuing the development of the determination of the design criteria it is necessary to determine the relationship for the pressure generated in a liquid by centrifugal force. This formula is given in Perry, Chemical Engineers' Handbook, third edition, page 993. The equation is as follows:

$$H = \frac{\omega^2}{2g} \cdot (r_0^2 - r^2)$$

and $$P_L = \rho_L \frac{\omega^2}{2g} \cdot (r_0^2 - r^2)$$

where
$r_0$ = the radius of the outer liquid surface or, the inside diameter of the basket B
$r$ = the radius of the melt free surface
$P_L$ = the gauge pressure developed by the centrifugal force at the wall of the basket
$H$ = the liquid head developed by centrifugal force at the wall of the basket
$y_{max}$ = the maximum height of the liquid surface
$\rho_L$ = liquid density The above equations are utilized in determining the total liquid head at any point at the wall of the basket if the liquid surface is not constrained by a baffle and is not bridging the basket. The equations are also useful in determining the total liquid head at any point at the wall of the basket if the liquid surface is constrained by a baffle but is not bridging the basket.

In determining the total liquid head at any point at the wall of the basket where the liquid surface is not constrained by a baffle and the surface is not bridging the basket, reference should be had to FIGURE 2 where this condition is shown, and the equations set forth below.

$$H = \frac{\omega^2(r_0^2 \text{ centrifugal} - r^2)}{2g}$$

also $$y = \frac{\omega^2(r^2 - r_i^2)}{2g}$$

therefore, $$H = \frac{\omega^2}{2g} \cdot \left( r_0^2 - \frac{2gy}{\omega^2} - r_i^2 \right)$$

or, $$H = \frac{\omega^2}{2g} \cdot (r_0^2 - r_i^2) - y$$

since $$y_{max} = \frac{\omega^2}{2g} \cdot (r_0^2 - r_i^2)$$

therefore, $$H = y_{max} - y$$

From the above, it can be seen that the liquid head at any point along the wall of the basket can be expressed either in terms of the angular velocity $\omega$ of the melt and the radii of the basket $r_0$ and melt free surface $r$ or in terms of the head of liquid above the point.

Under the condition wherein the melt is constrained by a baffle and the surface is not bridging the basket, the equation for the liquid head $H$ changes in accordance with the equations set forth below. This situation can best be seen in the schematic showing of FIGURE 3. In this drawing, the basket B has an annular horizontal baffle 10 whose outer diameter is equal to the inner diameter of the basket B. The melt rises due to centrifugal force against the underside of the horizontal baffle 10. The radius $r_*$ of the melt against the underside of the horizontal baffle 10 changes the equations for the liquid head as follows:

$$H = \frac{\omega^2}{2g} \cdot (r_0^2 - r^2)$$

$$y = \frac{\omega^2}{2g} \cdot (r^2 - r_i^2)$$

therefore, $$H = \frac{\omega^2}{2g} \cdot (r_0^2 - r_i^2) - y$$

also $$y_{max} = \frac{\omega^2}{2g} \cdot (r_*^2 - r_i^2)$$

therefore, $$H = \frac{\omega^2}{2g} \cdot (r_0^2 - r_*^2) + (y_{max} - y)$$

The equation for the liquid head for a basket with the liquid surface not constrained by a baffle and not bridging the basket can be utilized to calculate the melt distribution for such a basket as a function of the throughput, the hole orifice coefficient, and the hole area per unit height of basket wall.

The equation for the melt distribution is determined utilizing the following symbols:

$v$ = velocity through the hole
$c$ = the orifice coefficient
$A$ = hole area
$g$ = acceleration of gravity
$\rho_L$ = liquid density
$W$ = the weight flow rate $$v = c\sqrt{2gH}$$

or $$v = c\sqrt{2g(y_{max} - y)}$$

in differential height:

$$dW = c\rho_L \sqrt{2g(y_{max} - y)}\, dA$$

with uniform perforations:

$$\frac{dA}{dy} = k = \frac{\text{hole area}}{\text{unit height}}$$

therefore $$dW = kc\rho_L \sqrt{2g(y_{max} - y)}\, dy$$

$$W = -0.943 kc\rho_L g^{1/2} \left[ (y_{max} - y)^{1.5} \right]_0^{y_{max}}$$

$$W = 0.943 kc\rho_L g^{1/2} y_{max}^{1.5}$$

To determine the total melt discharge for the basket with the liquid surface constrained by a baffle but not bridging the basket, it is necessary to utilize the equation for H under the conditions of FIGURE 3. Under these conditions, $$v = c\sqrt{2g(y_{max} - y) + \omega^2(r_0^2 - r_*^2)}$$

$$dW = kc\rho_L \sqrt{2g(y_{max} - y) + \omega^2(r_0^2 - r_*^2)}\, dy$$

$$W = -\frac{kc\rho_L}{3g} \left[ [2g(y_{max} - y) + \omega^2(r_0^2 - r_*^2)]^{1.5} \right]_0^{y_{max}}$$

$$[2gy_{max} + \omega^2(r_0^2 - r_*^2)]^{1.5} = [\omega^2(r_0^2 - r_*^2)]^{1.5} + \frac{3Wg}{kc\rho_L}$$

In developing a prilling basket which approaches the ideal design therefor, it is necessary to utilize the equations set forth above in a manner wherein the variation in variables is controlled within limits, or minimized. For instance, if the hole spacing is increased to increase droplet dispersion, the range from the minimum to the maximum hole velocity will also increase unless the average hole velocity is increased by the use of wider horizontal baffles, or the angular velocity is increased. A design which accomplishes this is shown in FIGURES 4 and 5.

In this design, the basket 20 has been shown having a central drive shaft 22 and melt inlet conduits 24 and 26 fixedly spaced about the rotating drive shaft 22. The shaft 22 is driven by a suitable drive means, generally indicated as 29. The drive shaft 22 is provided with a slinger plate 28 horizontally disposed and vertically adjustable, onto which the fertilizer melt is fed through the annular melt inlet conduit concentric with the shaft 22. The slinger plate 28 slings the fertilizer melt outwardly by centrifugal force at the cylindrical wall 30 of the basket 20. Secured to the wall 30 are a plurality of horizontally disposed baffles, 34, 36, 38, 40, 42, 44, 46, 48 and 50. These baffles 34–50 are annular in shape and all the baffles, except 32, have their outer periphery integral with the wall 30. The horizontal baffles 34–50 are equally spaced one from another. The baffle 32, as may be seen in FIGURES 4 and 5, does not have its outer periphery integral with the wall 30, the annual baffles 32, being of a smaller diameter than the other horizontal baffles.

Baffles 32 and 34 have eight vertical baffles 52–60 integral therewith and extending from the top 62 of the basket 20, through a portion of baffle 32, and terminating in the upper face of baffle 34. Thus, the outer edge of the horizontal baffle 32 and the wall 30, as may be seen in FIGURES 4 and 5, provide an interrupted annular opening through which the melt may be distributed downwardly.

These vertical baffles are utilized to insure that the fertilizer melt is brought up to the angular velocity of the basket 20, and, with the centrifugal force exerted, assist in removing any air contained in the melt. The upper portion of wall 30 from the horizontal baffle 34 upward to the top wall 62 of the basket has no holes therethrough. This is to insure that prills are not produced in the upper sections. Such prills could be nonuniform in size if the angular velocity of the fertilizer melt were unequal to the basket angular velocity.

Between the horizontal baffles 34 and 36 and between each adjacent pair of horizontal baffles there are provided suitable holes 64 through the wall 30.

With the design shown in FIGURES 4 and 5, it is possible to independently vary the angular velocity, the hole spacing, the average hole velocity, and the maximum variation of hole velocities. The melt which is accelerated to the basket angular velocity overflows the horizontal baffle 34 and moves downwardly to the next lower horizontal baffle 36, etc., in a downflow arrangement.

Because a continuous liquid column is not formed along the wall 30, gravitational head is not transmitted from one section to another and the variation in hole velocities is principally a function of the height of each section (the distance between adjacent horizontal baffles) and the width of the baffles. The fact that the crest of the melt flowing over the baffles is somewhat greater at the top of the basket than at the bottom leads to some variation of hole velocity along the basket length, but this is relatively small. A given hole velocity can be maintained at any angular velocity by controlling the width of the baffles, and the droplet dispersion can be increased as much as desired by increasing the hole spacing and the number of horizontal sections. Utilizing a relatively large number of sections (spaces between adjacent horizontal baffles), also has the obvious advantage that the effect of the last active section operating only partially full is minimized. By having the melt first flow through two unperforated sections, it will be accelerated close to the basket speed before reaching the perforated sections.

In FIGURES 4 and 5, the basket was rotated at 250 r.p.m. and had an inside diameter of 7⅞ inches with the horizontal baffles having a width of 1 inch and being spaced 1 inch from one another. In such arrangement, the throughput was 30 MT/D.

With the basket shown in FIGURES 4 and 5, under the conditions discussed above, the velocity of melt passing through the holes 64 adjacent the underside of an upper horizontal baffle was determined to be approximately 4 feet per second, whereas the melt passing through a hole 64 adjacent the upper surface of a lower horizontal baffle was only 4.4 feet per second. Thus, there was only approximately a 10 percent differential in the melt velocity of the melt as it passed through the uppermost and lowest holes in a section (between horizontal baffles). It is obvious that this differential goes down with closer spacing of the horizontal baffles or higher rotational speed of the basket.

In testing the operation of the apparatus shown, it was found that with the basket rotating at 220 r.p.m., 97.2 percent of the prills ranged in size between 750 microns and 1500 microns. With the basket rotating at 250 r.p.m. the percentage within this range rose to 97.9 percent.

In contrast, with a prior art prilling basket operating at 200 r.p.m, the percentage of prills in the 750–1500 micron range was only 68 percent while only 57% of the prills were in the 1000–1500 micron range; the prior art basket was not utilizing the downflow principle, but was otherwise substantially the same in dimensions and size and spacing of holes. At 420 r.p.m. this same basket was only capable of providing 71.5 percent of the prills within the specified range. Accordingly, it is clear that a much more uniform prill size is obtained with the prilling basket of the present invention. Further, it was found that particularly at speeds of about 200–250 r.p.m. a very narrow distribution was possible. This narrow distribution makes it possible to determine the dimensions of a spray tower much more accurately than heretofore.

The present invention may be embodied in other specific forms without departing from the spirit or essential attributes thereof and, accordingly, reference should be made to the appended claims rather than to the foregoing specification as indicating the scope of the invention.

I claim:

1. An apparatus for forming uniform melt droplets comprising a vessel, a peripheral wall of said vessel being provided with a plurality of spray openings, drive means for rotating said vessel, means for introducing a melt into said vessel, and annular baffles being provided integral with the peripheral wall of the vessel and spaced one from the other, said spray openings being located between adjacent baffles.

2. The apparatus of claim 1 wherein said vessel is circular in cross-section, said annular baffles being circular in cross-section.

3. The apparatus of claim 2 wherein the baffles are spaced from where the melt is introduced, the peripheral wall of the vessel being imperforate in the space between the baffles and where the melt is introduced.

4. An apparatus for forming uniform melt droplets comprising a vessel; drive means for rotating said vessel; said vessel having an upright wall provided with spray openings therein; melt feed means for introducing melt into said vessel and a plurality of annular baffles being provided integral with said upright wall and spaced one from the other, said melt feed means including, a plate mounted in said vessel, said plate being rotated by said drive means, and melt feeders feeding liquid melt onto said plate.

5. The apparatus of claim 4 wherein said melt feed means introduces the melt into an upper portion of said vessel.

6. The apparatus of claim 5 including melt accelerating means, said melt accelerating means being formed on said upper portion of said upright wall to accelerate said melt to the velocity of said upright wall.

7. The apparatus of claim 6 wherein said melt accelerating means includes vertical baffles secured to and integral with the upper portion of said upright wall.

8. The apparatus of claim 7 including an additional horizontal annular baffle of reduced diameter formed integral with said vertical baffles below said plate.

9. An apparatus for forming uniform melt droplets comprising a vessel, a peripheral wall of said vessel being provided with a plurality of spray openings, drive means for rotating said vessel, melt feed means for introducing melt into said vessel, and annular baffles being provided integral with said peripheral wall and spaced one from the other, said melt feed means including, a plate mounted in said vessel, said plate being rotated by said drive means, and melt feeders feeding liquid melt onto said plate.

10. Apparatus for spraying melt comprising a cylindrical vessel, drive means for rotating said vessel about a vertical axis, melt feed means for accelerating melt and feeding said melt into the upper portion of the inner wall of said vessel, spaced annular horizontal baffles having their outer diameter equal to the inner diameter of said cylindrical vessel, said baffles being spaced along the length of said vessel integral with the inner wall of said vessel, said inner wall having holes therein between adjacent horizontal baffles extending through said wall.

11. The apparatus of claim 10 wherein said horizontal baffles are of uniform width, said horizontal baffles having a width equal to one another, said horizontal baffles being equally spaced from each other.

References Cited by the Examiner

UNITED STATES PATENTS

| | | | |
|---|---|---|---|
| 1,749,292 | 3/1930 | MacDonell | 210—381 X |
| 1,827,681 | 10/1931 | Van Der Molen | 210—381 X |
| 2,186,836 | 1/1940 | McGlaughlin | 210—381 X |
| 2,249,210 | 7/1941 | Johnson | 210—381 X |
| 2,294,221 | 8/1942 | Bowen et al. | |
| 2,973,550 | 3/1961 | Russell. | |
| 2,998,620 | 9/1961 | Stalego | 18—2.5 X |

FOREIGN PATENTS 1,124,488   7/1958   France.

WILLIAM J. STEPHENSON, *Primary Examiner.*